United States Patent
Cawley

(10) Patent No.: US 7,347,623 B2
(45) Date of Patent: Mar. 25, 2008

(54) COLLAPSIBLE BOWL

(76) Inventor: John Cawley, 5943 W. Dakin, Chicago, IL (US) 60634

( * ) Notice: Subject to any disclaimer, the term of this patent is extended or adjusted under 35 U.S.C. 154(b) by 320 days.

(21) Appl. No.: 10/872,896

(22) Filed: Jun. 21, 2004

(65) Prior Publication Data

US 2005/0281488 A1    Dec. 22, 2005

(51) Int. Cl.
B65D 33/00 (2006.01)
B65D 33/16 (2006.01)
B65D 30/16 (2006.01)

(52) U.S. Cl. .................. 383/33; 383/63; 383/104

(58) Field of Classification Search ......... 383/33–34.1, 383/104, 63, 36, 2
See application file for complete search history.

(56) References Cited

U.S. PATENT DOCUMENTS

| | | | | |
|---|---|---|---|---|
| 2,180,841 A | * | 11/1939 | Vogt | 383/210 |
| 2,833,460 A | * | 5/1958 | Votolato | 383/36 |
| 3,640,381 A | * | 2/1972 | Kanada et al. | 229/206 |
| 4,391,366 A | * | 7/1983 | Hirata | 206/218 |
| 4,428,500 A | * | 1/1984 | Kohler | 229/117 |
| 4,621,000 A | | 11/1986 | Frick | |
| 4,854,474 A | * | 8/1989 | Murray et al. | 220/1.5 |
| 4,941,754 A | * | 7/1990 | Murdock | 383/3 |
| 5,044,774 A | | 9/1991 | Bullard et al. | |
| 5,094,707 A | | 3/1992 | Bruno | |
| 5,132,124 A | * | 7/1992 | Tamaki et al. | 426/82 |
| 5,314,250 A | * | 5/1994 | Lee | 383/3 |
| 5,346,311 A | * | 9/1994 | Siler et al. | 383/75 |
| 5,478,152 A | * | 12/1995 | Bogle | 383/33 |
| 5,647,670 A | | 7/1997 | Iscovich | |
| 6,102,568 A | * | 8/2000 | Davis | 383/43 |
| 6,149,304 A | | 11/2000 | Hamilton et al. | |
| 6,200,028 B1 | | 3/2001 | Buchanan | |
| 6,290,392 B1 | | 9/2001 | Sandor | |
| 6,345,911 B1 | * | 2/2002 | Young et al. | 383/6 |
| 6,508,587 B1 | | 1/2003 | Byers, Jr. | |
| D482,614 S | | 11/2003 | Countee, Jr. | |
| 2003/0077007 A1 | | 4/2003 | Turvey et al. | |
| 2003/0215160 A1 | | 11/2003 | Kohn et al. | |

* cited by examiner

Primary Examiner—Jes F. Pascua
(74) Attorney, Agent, or Firm—Michael R. McKenna; Patrick N. Burkhart

(57) ABSTRACT

A collapsible bowl made of pliable materials that can be flattened or configured into an easily disposable or reusable bowl. A flexible collar is also provided which used with a sealable plastic baggy produces a collapsible bowl.

3 Claims, 2 Drawing Sheets

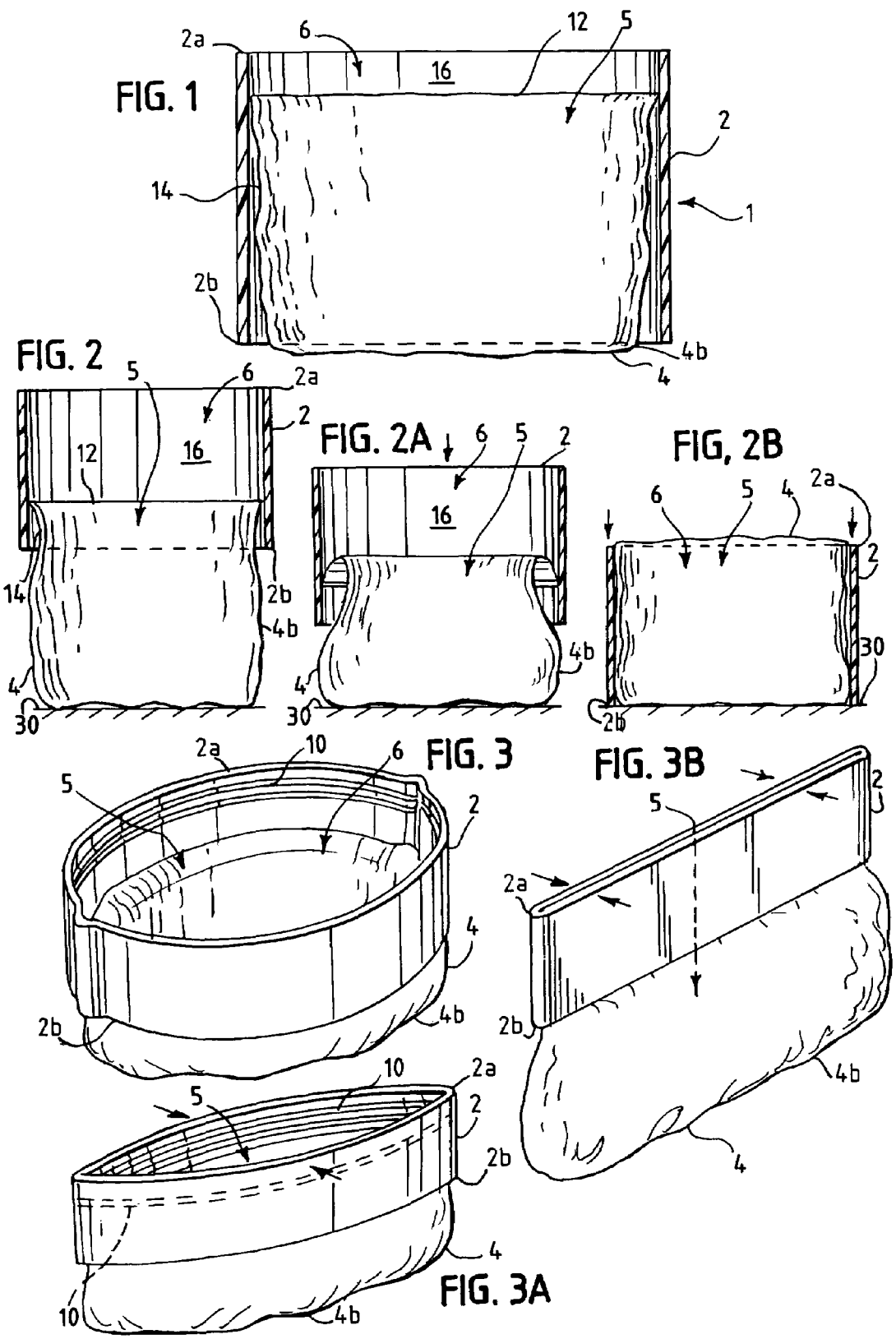

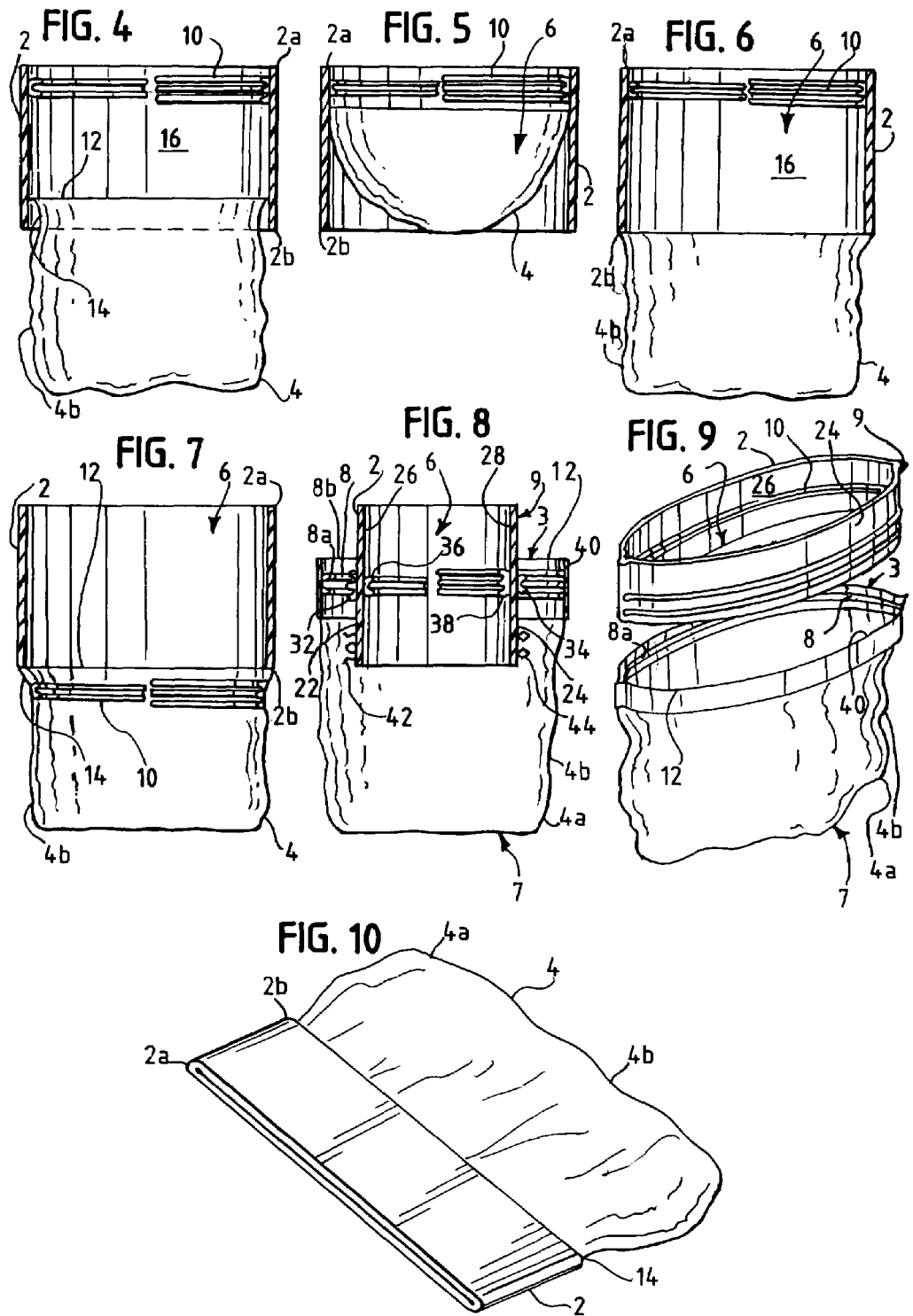

COLLAPSIBLE BOWL

The present invention relates to a collapsible bowl which can be laid flat and can also be configured into a bowl to uprightly hold edible food items, including liquids, on a horizontal surface such as a table.

BACKGROUND OF THE INVENTION

This invention relates to transportable bowl that is easily collapsed and easily configured into a useable bowl for both liquid and solid food items. A flexible collar is also provided to allow a typical sealable baggy to become a bowl with sufficient structural integrity to support liquid and solid items disposed therein.

Alternative technology is available in the form of a convertible package and bowl type container in U.S. Pat. No. 6,200,028 issued in 2001 to Buchanan. Unlike the present invention, its structure does not permit it to be made flat when not holding food items. See also U.S. Design Pat. No. D482,614 for a reclosable expanded snack carton which is structurally limited in the manner in which it can be used. U.S. Pat. No. 4,621,000 issued in 1986 to Frick relates to an edge stiffener limited to changing the configuration of the opening of a plastic bag. Moreover, a variety of aperture closure and opening means for plastic baggies are known. See U.S. patent application Ser. Nos. 2003/0215160 and 2003/0077007; and U.S. Pat. Nos. 6,508,587, 6,149,304, 5,647,670, 5,094,707, and 5,044,774.

The principal disadvantage of such device is that they fail to teach the unique structure of the present invention which provides for a collapsible bowl that is easily collapsed into a flat object and easily configured into a useable bowl for both liquid and solid food items. To alleviate this problem, and others which will become apparent from the disclosure which follows, the present invention conveniently provides both an integral flexible rim and a distinct flexible collar adapted for use with a conventional sealable baggy to make the collapsible bowl of this important invention.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

ADVANTAGES OF THIS INVENTION

Unlike the foregoing devices, this invention will allow users to, not only transport solid food items as the current art allows, but also to transport liquid items and combined liquid and solid items in the body portion of the collapsible bowl which can, when the user is ready to eat, be opened and the flexible collar and/or flexible rim can be made to structurally contain the food items. This eliminate the need for additional serving containers.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Still other advantages will be apparent from the disclosure that follows.

SUMMARY OF THE INVENTION

The invention relates to a collapsible bowl comprising a pliable impermeable body defining a receptacle space for holding edible food and a flexible rim wall. The impermeable body has an aperture disposed at an upper end of the body and the aperture has a peripheral rim. The flexible rim wall is connected to the peripheral rim of the impermeable body. The rim wall has an upper edge and a bottom edge, and is selectively configurable between to a first configuration in which the rim wall defines a passageway and a second configuration in which the rim wall is collapsed. The rim wall has sufficient distance between the upper edge and the lower edge so that the maximum volume of space of the passageway is at least as large as the volume of the receptacle space for holding edible food when the aperture is closed. The rim wall can be configured in the first configuration and the receptacle space for holding edible food of the impermeable body can disposed in the passageway of the rim wall to form a usable bowl.

A flexible collar for a collapsible bowl is also taught to be used in an environment comprising a sealable plastic bag having a pliable body defining a receptacle space for holding edible food, an aperture with a peripheral rim, and means for sealing that has first and second interlocking strips which interlock to selectively close and open the aperture of the bag. The flexible collar comprises a flexible rim wall connected to the peripheral rim of the bag. The rim wall has an upper edge and a bottom edge, is selectively configurable between to a first configuration in which rim wall defines a passageway and a second configuration in which the rim wall is collapsed, and has a first exterior surface, a second exterior surface, a first interior surface, and a second interior surface. The first exterior surface has a first complementary interlocking stip which interlocks with one of the first and second interlocking strips of the bag. The second exterior surface has a second complementary interlocking stip which interlocks with the other of the first and second interlocking strips of the bag. The first interior surface and the second interior surface have respective third and fourth interlocking strips which interlock to selectively close and open the passageway, and the rim wall has sufficient distance between the upper edge and the lower edge so that the maximum volume of space of the passageway is at least as large as the volume of the receptacle space for holding edible food when the aperture is closed. In this way, the flexible collar can be interlocked to the peripheral edge of the bag to form the collapsible bowl, and the rim wall of the collapsible bowl can be configured in the first configuration and allow the passageway to receive the pliable body.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWING

Preferred embodiments of the invention are described hereinafter with reference to the accompanying drawing wherein:

FIG. 1 is a sectional elevation view of the collapsible bowl of the present invention;

FIGS. 2, 2A, and 2B are illustrations showing the rim wall configuring around the impermeable body to form a collapsible bowl;

FIGS. 3, 3A, and 3B are perspective views of the collapsible bowl with the flexible rim disposed in a first configuration, the flexible rim partially closed, and the flexible rim closed, respectively;

FIG. 4 is a sectional elevation view of the collapsible bowl of the present invention incorporating sealing strips to close the bowl and with the impermeable body connected to the flexible rim proximate the bottom edge thereof;

FIG. 5 is a sectional elevation view of the collapsible bowl of the present invention incorporating sealing strips to close the bowl and with the impermeable body connected to the flexible rim proximate the top edge thereof;

FIG. 6 is a sectional elevation view of the collapsible bowl of the present invention incorporating sealing strips to close the bowl and with the impermeable body extending from the bottom edge of the flexible rim;

FIG. 7 is a sectional elevation view of the collapsible bowl of the present invention with the impermeable body extending from the flexible rim and with interlocking strips on the body portion proximate the peripheral rim;

FIG. 8 is a sectional elevation view of the collapsible bowl of the present invention with the flexible collar position to mate with a sealable plastic bag;

FIG. 9 is an exploded perspective view of the flexible collar and the sealable plastic bag; and FIG. 10 is a perspective view of the collapsible bowl of the present invention in a collapsed configuration without edible food contained therein.

DETAILED DESCRIPTION OF THE INVENTION

The preferred embodiments of the apparatus depicted in the drawing comprise a collapsible bowl 1 having a flexibly rigid rim wall 2 associated with the opening of a impermeable body 4, a pliable plastic bag 4a. The body 4 of the collapsible bowl 1 may have a hemispherical shape as supported by the rim when the device is configured as a bowl, as shown in FIG. 5. Moreover, while a means for sealing 10 the food contents in the collapsible bowl in a first configuration is not necessary to the invention—it is preferred. It is further contemplated that the food contents will aid in maintaining the collapsible bowl in its usable bowl configuration, but additional stiffeners may be provided. It is further contemplated that the collapsible bowl will be self-supporting. Without departing from the generality of the invention disclosed herein and without limiting the scope of the invention, the discussion that follows, will refer to the invention as depicted in the drawing.

A collapsible bowl 1 comprising a pliable impermeable body 4 defining a receptacle space 5 for holding edible food and a flexible rim wall 2. The impermeable body 4 has an aperture 3 disposed at an upper end 14 of the body 4 and the aperture 3 has a peripheral rim 12. The flexible rim wall 2 is connected proximate to the peripheral rim 12 of the impermeable body 4. The rim wall 2 has an upper edge 2a and a bottom edge 2b, and is selectively configurable between to a first configuration (shown in FIG. 3) in which the rim wall 2 defines a passageway 6 and a second configuration (shown in FIG. 3B) in which the rim wall 2 is collapsed. The rim wall 2 has sufficient distance between the upper edge 2a and the lower edge 2b so that the maximum volume of space of the passageway 6 can be at least as large as the volume of the receptacle space 5 for holding edible food when the aperture is closed, as shown in FIG. 3B. As shown in FIG. 2B, the rim wall 2 can be configured in the first configuration and the receptacle space 5 for holding edible food of the impermeable body 4 can disposed in the passageway 6 of the rim wall 2 to form a usable bowl.

As shown in the drawing, the impermeable body 4 may comprise a flexible bag 4b. Additionally, the pliable impermeable body 4 may be configured flat when edible food is absent from the receptacle space 5, as shown in FIG. 4. The collapsible bowl may be made flat when the rim wall is collapsed in the second configuration and the pliable impermeable body is configured flat. Furthermore, the flexible rim wall 2 may extend from the peripheral rim 12 of the impermeable body 4, as shown in FIGS. 6-7.

In a preferred embodiment of the collapsible bowl 1 of this important invention, the peripheral rim 12 of the impermeable body 4 is connected proximate the upper edge 2a of the rim wall 2, as shown in FIG. 5. Alternatively, the peripheral rim 12 of the impermeable body may be connected proximate the bottom edge 2b of the rim wall, as shown in FIG. 4. Additionally, the flexible rim wall may have means for sealing 10 disposed on an inner surface 16, as shown in FIGS. 3-6. As shown in FIG. 8, the peripheral rim may have the means for sealing. The means for sealing may comprise a reclosable element of the type commonly used on reclosable plastic bags. Such bags typically have first and second complementary strips (18 and 20, respectively) which interlock to repeatedly close and allow opening of the bag.

The flexible rim wall 2 may be selectively configurable to an open position in which the receptacle space for holding edible food can be disposed within the rim wall and to a collapsed configuration in which edible food disposed in the receptacle space below the bottom edge of the rim wall, as shown in FIGS. 2-4. The flexible rim wall may have a generally round cross-section as best seen in FIG. 2.

In an environment comprising a serving surface 30, as shown in FIGS. 2, 2A and 2B, the collapsible bowl 1 can comprise a pliable impermeable body 4 defining a receptacle space 5 for holding edible food and a flexible rim wall 2. The impermeable body 4 may have an aperture 3 with a peripheral rim 12 disposed at an upper end 14 of the body 4. The flexible rim wall 2 can be connected to the peripheral rim 12 of the impermeable body. As best shown in FIG. 11, the rim wall has an upper edge 2a and a bottom edge 2b, and as shown in FIGS. 2-4, the rim wall 2 is selectively configurable between to a first configuration in which rim wall defines a passageway 6 and a second configuration in which the rim wall is collapsed. One of the unique characteristics of the rim wall 2 is that it has sufficient distance between the upper edge 2a and the lower edge 2b so that the maximum volume of space of the passageway 6 can be at least as large as the volume of the receptacle space 5 for holding edible food when the aperture 3 is closed, as best viewed in FIG. 3B. The collapsible bowl can thus be configured with the rim wall in the first configuration (FIG. 3) to allow the passageway 6 to receive the impermeable body 4 and any edible food contained therein as the impermeable body is disposed on the serving surface 30 and the bottom edge 2b of the rim wall 2 is brought to rest on the serving surface 30 so that the rim wall surrounds the impermeable body 4 and any edible food contained therein, as shown in FIG. 2B.

In an environment comprising a sealable plastic bag 7 having a pliable body 4 defining a receptacle space for holding edible food, an aperture 3 with a peripheral rim 12, and means for sealing 8 of the sealable bag that has first and second interlocking strips (8a and 8b, respectively) which interlock to selectively close and open the aperture 3 of the bag 7, a flexible collar 9 for a collapsible bowl is provided comprising a flexible rim wall 2 reversibly connected to the bag proximate the peripheral rim 12 thereof. The rim wall 2 has an upper edge 2a and a bottom edge 2b, is selectively configurable between to a first configuration in which rim wall defines a passageway 6, and a second configuration in which the rim wall is collapsed, and has a first exterior surface 22, a second exterior surface 24, a first interior surface 26, and a second interior surface 28. The first exterior surface 22 has a first complementary interlocking stip 32 which interlocks with one of the first and second interlocking strips (8a and 8b, respectively) of the bag 7. The second exterior surface 24 has a second complementary interlocking stip 34 which interlocks with the other of the first and second interlocking strips (8a and 8b, respectively) of the bag 7. The first interior surface 26 and the second interior surface 28 have respective third and fourth interlocking strips (36 and 38, respectively) which interlock to selectively close and open the passageway 6, and the rim wall 2 has sufficient distance between the upper edge 2a and the lower edge 2b so that the maximum volume of space of the passageway 6 is at least as large as the volume of the receptacle space 5 for holding edible food when the aperture is closed. In this way, the flexible collar 9 can be interlocked proximate the peripheral edge 40 of the bag 7 to form the collapsible bowl 1, and the rim wall 2 of the collapsible bowl can be configured in the first configuration and allow the passageway to receive the pliable body 4. Alternatively, the collapsible bowl 1 may have the volume of the receptacle space for holding edible food when the aperture 3 is closed not substantially exceeding the maximum volume of space of the passageway 6.

As shown in FIG. 8, the flexible collar 9 may further have the first exterior surface 22 with a first plurality of distinct complementary interlocking strips (32 and 42) one of which interlocks with one of the first and second interlocking strips of the bag (8a and 8b), and the second exterior surface 24 has a second plurality complementary interlocking strips (34 and 44) one of which interlocks with the other of the first and second interlocking strips of the bag, so that the flexible collar 9 can mate with a plurality of bags having distinct interlocking strips.

In an environment comprising a serving surface and a sealable plastic bag that has a pliable body defining a receptacle space for holding edible food, an aperture has a peripheral rim, and means for sealing that has first and second interlocking strips which interlock to selectively close and open the aperture of the bag, a flexible collar 9 for a collapsible bowl 1 is provided comprising a flexible rim wall 2 reversibly connected to the bag 7 proximate the peripheral rim 12. The rim wall 2 has an upper edge 2a and a bottom edge 2b and is selectively configurable between to a first configuration in which rim wall defines a passageway 6 and a second configuration in which the rim wall is collapsed. The rim wall 2 has a first exterior surface 22, a second exterior surface 24, a first interior surface 26, and a second interior surface 28. Said first exterior surface 22 has a first complementary interlocking stip 32 which interlocks with one of the first and second interlocking strips (8a and 8b) of the bag 7, and the second exterior surface 24 has a second complementary interlocking stip 34 which interlocks with the other of the first and second interlocking strips of the bag. The first interior surface 26 and the second interior surface 28 have respective third and fourth interlocking strips (36 and 38) which interlock to selectively close and open the passageway 6. The rim wall 2 has sufficient distance between the upper edge 2a and the lower edge 2b so that the maximum volume of space of the passageway is at least as large as the volume of the receptacle space 5 for holding edible food when the aperture 3 is closed, so that the flexible collar 9 can be interlocked near the peripheral edge 40 of the bag 7 to form the collapsible bowl, and the rim wall 2 of the collapsible bowl can be configured in the first configuration to allow the passageway 6 to receive the pliable body 4 as the pliable body is disposed on the serving surface 30 and the bottom edge 2b of the rim wall 2 is brought to rest on the serving surface 30 so that the rim wall substantially surrounds the impermeable body 4 and any edible food contained therein.

Moreover, the collapsible bowl 1 may comprise a pliable impermeable body 4 defining a receptacle space 5 for holding edible food and a flexible rim wall 2. The impermeable body 4 has an aperture 3 disposed at an upper end 14 of the body 4 and the aperture 3 has a peripheral rim 12. The flexible rim wall 2 is connected to the upper end 14 of the impermeable body. The rim wall has an upper edge 2a and a bottom edge 2b, and is selectively configurable between to a first configuration in which the rim wall defines a passageway 6 and a second configuration in which the rim wall is collapsed, as shown in FIG. 10. The rim wall 2 has sufficient distance between the upper edge 2a and the lower edge 2b so that the maximum volume of the receptacle space 5 for holding edible food when the aperture 3 is closed is at least as large as the volume of space of the passageway 6. In this way, the rim wall 2 can be configured in the first configuration and at least a substantial portion of the receptacle space for holding edible food of the impermeable body can disposed in the passageway 6 of the rim wall 2.

The collapsible bowl and the flexible collar for the collapsible bowl of the instant invention are preferably made of plastics or other flexible materials. The body of the collapsible bowl can be made of the thin walled material typically found in sealable plastic bags, while the flexible rim wall and the flexible collar may utilize a thicker walled material with flexible rigidity for greater structural integrity. Furthermore, materials having suitable heat resistant characteristics are contemplated so that hot meals can be served for the collapsible bowl of this invention. It is contemplated that both the flexible rim of the collapsible bowl and the flexible collar for the collapsible bowl will exhibit a requisite degree of stiffness for their intended use. It is contemplated that both the collapsible bowl and the flexible collar for the collapsible bowl will be reusable. It is therefore preferred that the materials employed be washable.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

My invention resides not in any one of these features per se, but rather in the particular combinations of some or all of them herein disclosed and claimed and it is distinguished from the prior art in these particular combinations of some or all of its structures for the functions specified.

With respect to the above description then, it is to be realized that the optimum dimensional relationships for the parts of the invention, including variations in size, materials, shape, form, function and manner of operation, assembly and use, and all equivalent relationships to those illustrated in the drawings and described in the specification, that would be deemed readily apparent and obvious to one skilled in the art, are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. In an environment comprising a sealable plastic bag having a pliable body defining a receptacle space for holding edible food, an aperture having a peripheral rim, and means for sealing that has first and second interlocking strips which interlock to selectively close and open the aperture of the bag, a flexible collar for a collapsible bowl comprising: a. a flexible rim wall reversibly connected to the bag proximate the peripheral rim, said rim wall having an upper edge and a bottom edge, said rim wall being selectively configurable between to a first configuration in which rim wall defines a passageway and a second configuration in which the rim wall is collapsed, said rim wall having a first exterior surface, a second exterior surface, a first interior surface, and a second interior surface, said first exterior surface having a first complementary interlocking strip which interlocks with one of the first and second interlocking strips of the bag, said second exterior surface having a second complementary interlocking strip which interlocks with the other of the first and second interlocking strips of the bag, said first interior surface and said second interior surface having respective third and fourth interlocking strips which interlock to selectively close and open the passageway, said rim wall having sufficient distance between the upper edge and the bottom edge so that the maximum volume of space of the passageway is at least as large as the volume of the receptacle space for holding edible food when the aperture is closed, whereby, the flexible collar can be interlocked proximate the peripheral edge of the bag to form the collapsible bowl, and the rim wall of the collapsible bowl can be configured in the first configuration to allow the passageway to receive the pliable body.

2. The flexible collar of claim 1, wherein the first exterior surface has a first plurality of distinct complementary interlocking strips one of which interlocks with one of the first and second interlocking strips of the bag, and the second exterior surface has a second plurality complementary interlocking strips one of which interlocks with the other of the first and second interlocking strips of the bag, whereby, the flexible collar can mate with a plurality of bags having distinct interlocking strips.

3. In an environment comprising a serving surface and a sealable plastic bag having a pliable body defining a receptacle space for holding edible food, an aperture having a peripheral rim, and means for sealing that has first and second interlocking strips which interlock to selectively close and open the aperture of the bag, a flexible collar for a collapsible bowl comprising a flexible rim wall reversibly connected to the bag proximate the peripheral rim, said rim wall having an upper edge and a bottom edge, said rim wall being selectively configurable between to a first configuration in which rim wall defines a passageway and a second configuration in which the rim wall is collapsed, said rim wall having a first exterior surface, a second exterior surface, a first interior surface, and a second interior surface, said first exterior surface having a first complementary interlocking strip which interlocks with one of the first and second interlocking strips of the bag, said second exterior surface having a second complementary interlocking strip which interlocks with the other of the first and second interlocking strips of the bag, said first interior surface and said second interior surface having respective third and fourth interlocking strips which interlock to selectively close and open the passageway, said rim wall having sufficient distance between the upper edge and the bottom edge so that the maximum volume of space of the passageway is at least as large as the volume of the receptacle space for holding edible food when the aperture is closed, whereby, the flexible collar can be interlocked proximate the peripheral edge of the bag to form the collapsible bowl, and the rim wall of the collapsible bowl can be configured in the first configuration to allow the passageway to receive the pliable body as the pliable body is disposed on the serving surface and the bottom edge of the rim wall is brought to rest on said serving surface so that the rim wall surrounds the impermeable body and any edible food contained therein.

* * * * *